July 28, 1925.
G. HUHN
PACKING FOR PISTON RODS, TURBINE SHAFTS, AND THE LIKE
Filed Sept. 2, 1924
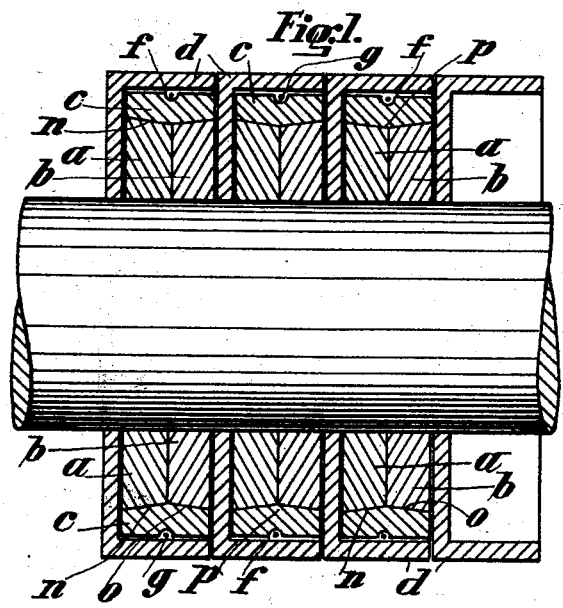
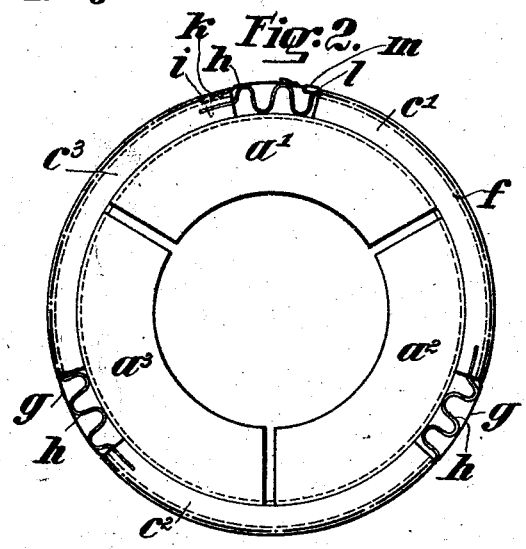
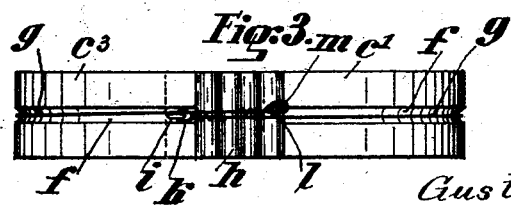
Inventor
Gustav Huhn
by H. B. Willson & Co
Attorneys Patented July 28, 1925.

1,547,919

UNITED STATES PATENT OFFICE.

GUSTAV HUHN, OF BERLIN, GERMANY.

PACKING FOR PISTON RODS, TURBINE SHAFTS, AND THE LIKE.

Application filed September 2, 1924. Serial No. 735,477.

*To all whom it may concern:*

Be it known that I, GUSTAV HUHN, manufacturer, citizen of Germany, residing at Berlin, in Prussia, Germany, have invented new and useful Improvements in Packings for Piston Rods, Turbine Shafts, and the like (for which I have filed application in Germany April 11, 1922), of which the following is a specification.

This invention relates to a packing for piston rods, turbine shafts and the like of that type in which packing rings composed of several parts are embraced by ring-shaped pressing elements either directly or indirectly. The ring-shaped pressing elements are generally exposed to the action of a tubular spring made from steel wire or the like and wound up in screw shape, by the tension of which the packing rings are pressed elastically against the piston rod or against the shaft. This known arrangement presents among others the following inconveniences. The tubular springs made from hard thin steel wire cut into the bearing face of the packing rings whereby transverse grooves are produced which prevent a free displacement of the spring around the packing rings. The heat, the lubricant and dust exert a prejudicial action upon the tubular spring so that it loses after some time its elasticity, being no longer capable to compensate by its contraction the wearing of the packing rings. Especially owing to the repeated strong heating and cooling to which the long tubular spring is exposed in the stuffing box the tubular spring relaxes so that it does no longer work properly.

According to the present invention these inconveniences are avoided by making the pressing elements, by means of which the parts of the subdivided packing rings are held together, from non-elastic pieces between which short elastic pieces are inserted. The arrangement is preferably made in such a manner that the elastic pieces are submitted to compressive stress when the ring-shaped pressing elements are expanding. Thus the decrease of the elasticity is excluded which occurs in the long tubular spring submitted to tensile stress when the packing is expanding. In the arrangement according to the invention spiral springs may be dispensed with and the elastic pieces may consist of blade springs and especially of undulatory springs.

The non-elastic portions of the ring-shaped pressing elements may be made from wire or strips and the elastic pieces may be arranged in such a manner that a portion of the same is submitted to compressive stress and a corresponding other portion is submitted to tensile stress at the expanding of the ring-shaped pressing elements so that the stresses compensate one another entirely or partly.

One embodiment of the packing according to the invention is shown by way of example on the accompanying drawing which illustrates a form of construction in which wedge-shaped packing- and embracing rings are encircled by the ring-shaped pressing elements constructed according to the invention.

Fig. 1 shows the packing in longitudinal section,

Fig. 2 shows a front view of one of the packing elements employed, and

Fig. 3 a side view thereof.

In the form of construction shown the packing rings encircling a piston rod or shaft are illustrated as made from compact metal. Each packing element is composed of two subdivided rings $a$ and $b$ and each of these two rings consists of three segments. In Fig. 2 the segments $a'$, $a^2$, $a^3$ of the ring $a$ are visible. These packing rings proper have outer surfaces $n$ or $o$ respectively which are inclined in inward direction and they are enclosed by an embracing ring $c$ which is also composed of three segments $c'$, $c^2$, $c^3$ (Fig. 2) and has a wedge-shaped inner surface $p$. An annular groove $f$ is arranged in the outer surface of ring $c$, and a ring shaped wire $g$ serving as a pressing element is located in said groove.

Between the ends of the segments $c'$, $c^2$, $c^3$ short undulated springs $h$ are arranged. It is not necessary that such springs are provided between all these segments of the ring $c$ as under certain conditions only one single spring might be sufficient.

The rings $c$, $a$ and $b$ might also be composed of two parts or of more than three parts.

One end of the ring-shaped wire or strip $g$ is annexed to one end of one of the undulated springs $h$, for instance by means of a loop $m$ entering a hole $l$ of said spring (Fig. 3), and this wire $g$ is arranged in such a manner that it extends over the curves of the undulated spring $h$ to which it is connected, as can be seen from Fig. 3. The other end of the wire $g$ also extends over the same undulated spring $h$ and is fixed to a pin $i$ in the end of the segment $c^3$, said pin also serving to attach the undulated spring in question to this segment. Thus the two ends of the pressing ring or wire $g$ are arranged in such a manner that they overlap one another. The undulated spring situated in the cross section of the ring $c$ thereby is contracted when the packing is widened by the lateral movements of the piston rod or shaft, but said spring expands again when the packing recontracts. As the wire ring $g$ bears on the undulations of the springs $h$, these springs are submitted to stress not only in the circumferential direction but also in the radial direction in such a manner that the variations of form of the spring which are thus produced counteract one another.

Each of the packing elements shown in Figures 2 and 3 and composed of the two subdivided rings $a$ and $b$, the subdivided wedge ring $c$ with the interposed undulated springs $h$ and the encircling wire or strip $g$, is enclosed by a chamber $d$ of triangular cross section (Fig. 1).

In the form of construction shown, the wire $g$ is attached only to one of the three undulated springs $h$ in the above-described manner so that at this point the undulated spring is inserted into the non-elastic wire.

Instead of a wire another ring-shaped pressing element might be used.

Having now particularly described and set forth the nature of my said invention, I declare that what I claim is:—

1. A packing for piston rods, turbine shafts and the like comprising divided metal packing rings and ring-shaped pressing elements embracing said packing rings, said pressing elements being composed of non-elastic segments and of undulated springs, said undulated springs being inserted between said non-elastic pieces.

2. A packing for piston rods, turbine shafts and the like comprising divided metal packing rings and ring-shaped pressing elements embracing said packing rings, said pressing elements being composed of non-elastic segments and of undulated springs, said undulated springs being inserted between said non-elastic pieces, and a non-elastic flexible element surrounding said undulated springs.

3. A packing for piston rods, turbine shafts and the like comprising divided metal packing rings and ring-shaped pressing elements embracing said packing rings, said pressing elements being composed of non-elastic segments and of undulated springs, said undulated springs being inserted between said non-elastic pieces, and a flexible wire surrounding said undulated springs.

4. A packing for piston rods, turbine shafts and the like comprising divided metal packing rings and ring-shaped pressing elements embracing said packing rings, said pressing elements being composed of non-elastic segments and of undulated springs, said undulated springs being inserted between said non-elastic pieces, and a flexible wire surrounding said undulated springs, one end of said wire being fixed to one of said undulated springs and extending over the undulations of said undulated springs and over the non-elastic segments between said undulated springs, the other end of said wire being fixed at that non-elastic segment which is adjacent to said undulated spring where the first end of said wire is fixed, in such a manner that the two ends of said wire overlap one another above the corresponding undulated spring.

5. A pressure ring for a ring-shaped packing composed of several parts consisting of non-elastic segments and of undulated springs arranged between said segments, said non-elastic segments having a circumferential annular groove, a non-elastic flexible wire-shaped element in said groove bearing upon the undulations of the undulated springs.

In testimony whereof I have hereunto set my hand in presence of two subscribing witnesses.

GUSTAV HUHN.

Witnesses:
 WLAD. ENDER,
 ROY V. FOX.